United States Patent
Sacks

[11] Patent Number: 6,138,275
[45] Date of Patent: *Oct. 31, 2000

[54] LAYERED ARMORED SHIELD

[76] Inventor: Michael Sacks, P.O. Box 456, Manchester M60 2L1, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/596,096

[22] PCT Filed: Aug. 1, 1994

[86] PCT No.: PCT/GB94/01677

§ 371 Date: Aug. 29, 1996

§ 102(e) Date: Aug. 29, 1996

[87] PCT Pub. No.: WO95/04911

PCT Pub. Date: Feb. 16, 1995

[30] Foreign Application Priority Data

Aug. 4, 1993 [GB] United Kingdom .................. 9316172

[51] Int. Cl.⁷ ........................................ F41H 1/02
[52] U.S. Cl. ............................... 2/2.5; 89/36.05
[58] Field of Search ................ 2/2.5; 428/911; 89/36.05, 36.01, 36.02

[56] References Cited

U.S. PATENT DOCUMENTS

| | | |
|---|---|---|
| 4,413,357 | 11/1983 | Sacks . |
| 4,683,172 | 7/1987 | LeGrand et al. . |
| 4,774,724 | 10/1988 | Sacks ............................................. 2/2.5 |

FOREIGN PATENT DOCUMENTS

| | | |
|---|---|---|
| 1556245 | 11/1979 | United Kingdom . |
| 2061089 | 5/1981 | United Kingdom ......................... 2/2.5 |
| 2124887 | 2/1984 | United Kingdom ......................... 2/2.5 |
| 2128720 | 5/1984 | United Kingdom . |
| 2214405 | 9/1989 | United Kingdom ......................... 2/2.5 |
| 2258389 | 2/1993 | United Kingdom . |
| 2281021 | 2/1995 | United Kingdom ......................... 2/2.5 |

*Primary Examiner*—Michael A. Neas
*Attorney, Agent, or Firm*—Banner & Witcoff, Ltd.

[57] ABSTRACT

A protective shield, especially body armor, comprises a flexible penetration-resistant layer (1) backed up by a flexible impact-absorbing layer (2) of plastics material consisting of one or more layers of impact-absorbing plastics material each less than 0.75 mm thick so as to give increased flexibility without compromising impact-absorption. Preferably, multiple sheets of polycarbonate 0.5 mm or less thick are used, and the overall thickness of these sheets is less than 0.75 mm.

15 Claims, 2 Drawing Sheets

LAYERED ARMORED SHIELD

TECHNICAL FIELD

This invention relates to a protective shield suitable for use as ballistic-resistant or stab-resistant body armor.

Most body armor today makes use of ballistic cloth woven from aramid fiber such as that sold by Du Pont under their trade mark "KEVLAR" and by Akzo under their trade mark "TWARON". However, another form of ballistic cloth is now available woven from high density polyethylene fiber and sold by Allied Signal under their trade mark "SPECTRA" and by Dutch State Mines under their trade mark "DYNEEMA". The fibers of both of these cloths have a sufficiently high tensile strength to make them resistant to penetration by a bullet, the level of protection being dependent on the density of the fibers in the cloth and the number of layers of cloth employed in the armor. However, the weight and flexibility of the armor are also relevant factors if it is to be incorporated in protective clothing, and thus a balance is required between the level of protection required and the comfort of the user in selecting the materials to be used.

High density polyethylene fiber is also available in a non-woven film or sheet form in which the fibers are laid-up as two orthogonal sets of plies in an elastomeric matrix of low density polyethylene. This non-woven ballistic-resistant material is sold by Allied Signal under their trade mark "SPECTRASHIELD" and by Dutch State Mines under their trade mark "UD66". An advantage of this material is that the lack of a woven structure and the provision of a plastic matrix helps resist ply separation when struck by a bullet and thus it is more resistant to penetration. This in turn helps to improve the capability of "SPECTRASHIELD" to withstand penetration by bullets fired in a multi-shot sequence. Polyethylene fiber is also available as a non-woven mat and is sold by Dutch State Mines under their trademark "FRAGILITE".

It is also known from GB Patent No. 1556245 to produce body armor comprising layers of "KEVLAR" backed up by a layer of an impact-absorbing plastics material so as to absorb and limit transmission of the impact shock of a bullet to the body of a person being protected. The preferred impact-absorbing plastics material comprises a polycarbonate sheet which is backed up by a resiliently compressible sheet of a foamed plastics material that further spreads the impact and spaces the polycarbonate away from the body. This impact absorbing layer has become known as a "trauma pack" or "trauma shield", and the level of trauma protection it affords is measured in terms of the deformation of the backface of the layer.

The polycarbonate trauma shield in GB 1556245 consists of one or more polycarbonate sheets, each 0.75 mm thick. The polycarbonate sheet is flexible enough to conform, at least partially, to the body shape of a wearer when incorporated in a garment. Nevertheless, the polycarbonate sheet is still thick enough to be resistant to bending, especially bending in two or more directions simultaneously, and thus it limits the freedom of movement of the wearer. This problem has been alleviated by incorporating body armor in garments in the form of breast plates or backplates.

DISCLOSURE OF THE INVENTION

An object of the present invention is to provide body armor which is more flexible than hitherto without any reduction in the level of ballistic and trauma protection afforded by it.

This object is achieved according to the present invention by providing a protective shield comprising a flexible penetration-resistant layer backed up by a flexible impact-absorbing layer of plastics material, characterised in that the impact-absorbing layer consists of a plurality of layers of impact-absorbing plastics material each less than 0.75 mm thick.

The invention is based on an appreciation of the fact that even a relatively thin layer of an impact-absorbing plastics material, such as polycarbonate, manifests a high level of trauma protection. Further, it has been found that whilst the flexibility of such material increases substantially uniformly with reduction in thickness, the level of trauma protection afforded by such material does not decrease in proportion to the reduction in its thickness. Thus, multiple laminations of such material of the appropriate thickness can be selected to produce a trauma pack with a desired combination of trauma protection and flexibility.

For example, a comparison of the trauma protection afforded by relatively thin polycarbonate sheets, such as sheets 0.175 mm and 0.250 mm thick, reveal that they afford similar levels of trauma protection, even when used in similar numbers as laminations in a trauma pack with a significant difference in overall thickness of the pack. This suggests that the level of trauma protection is dependent on a surface effect in the polycarbonate sheet which is retained with thinner sheets, even though any bulk effect caused by the thickness of the sheet may be reduced.

Also, polycarbonate sheets 0.175 mm and 0.250 mm thick are extremely flexible, the former especially being able to bend in multiple directions at the same time, and therefore has flexible properties more like a woven cloth than a plastics sheet. This compares very favorably with a polycarbonate sheet 0.75 mm thick or thicker which will normally only bend in one direction and then forms a channel shape which resists bending in any other direction. Thus, multiple polycarbonate sheets 0.175 mm or 0.250 mm thick can be used with flexible penetration-resistant material such as "KEVLAR" or "SPECTRA SHIELD" to produce body armor which is especially flexible and therefore more comfortable and less conspicuous to wear, and which can be more readily incorporated into all surfaces of a protective garment. These benefits are all very important if body armor is to perform effectively and still be acceptable to users.

Preferably, a trauma pack according to the invention consists in multiple sheets of an impact-absorbing plastics material such as polycarbonate each 0.5 mm or less thick.

Further, a trauma pack according to the invention consists in multiple sheets of an impact-absorbing plastics material such as polycarbonate and which has an overall thickness less than 0.75 mm.

The body armor may be designed to resist ballistic projectiles such as bullets or shrapnel, or may be designed to resist knife attack. In the case of stab-resistant armor, the penetration-resistant layer may incorporate rigid plates, which may be backed-up with ballistic-resistant material to make the armor both ballistic and stab-resistant.

Also, body armor of the present invention can be used on the bodyside of hard armor composed of ceramic, "SPECTRASHIELD" laminate, titanium, steel or similar metal plate. Also, body armor designed to resist low velocity projectiles may be upgraded by backing up with armor of the present invention.

Body armor according to the present invention also makes use of flexible impact-absorbing material less than 0.75 mm thick in between flexible ballistic-resistant materials, in particular, to improve their behavior under bending. For example, materials such as "SPECTRASHIELD or UD66" suffer a permanent loss in ballistic capacity when they are force-creased i.e the area of the crease becomes permanently deformed. Aramid-based ballistic materials are also affected by force creasing, although to a lesser extent, because of their woven structure. The use of multiple layers of the flexible impact-absorbing material, such as polycarbonate, less than 0.75 mm thick between layers of materials such as "Spectra Shield UD66" or the aramid-based materials has been found to improve their behavior under bending and at least mitigate the problems caused by forced creasing.

The body armor of the present invention is further advantageous over known body armor when used against multi-shot weapons in that the "bubble" produced on impact by a bullet is relatively soft, remains flexible, and can withstand further impacts whereas when thicker materials (i.e ≧0.75 mm) are used the bubble is relatively hard and thus less resistant to further impacts.

Whilst the invention has been described above in its application to body armor, it will be appreciated that it is equally applicable to protecting any article or equipment that needs protection, especially ballistic protection. For example, a shield according to the invention may be used to protect pressurised gas storage bottles or ammunition.

DESCRIPTION OF THE DRAWINGS

The Invention will now be described by way of example only with reference to the accompanying drawings in which.

MODE OF CARRYING OUT THE INVENTION

Figure 1:
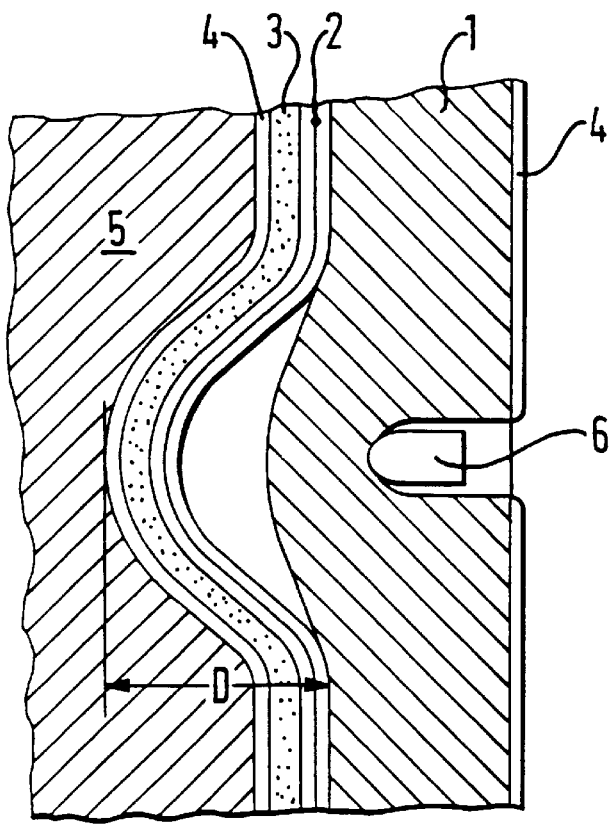
FIG. 1 shows a section through a sample of body armor according to the invention.

Samples of body armor incorporating a trauma pack were made up and tested as shown in FIG. 1. Twenty five layers of "KEVLAR" were formed into a laminated pack 1 and backed up by a number of sheets of polycarbonate 2 and a sheet of resiliently compressible foamed plastics material 3, the whole assembly being contained in an outer nylon case 4 for testing. The assembled sample was then placed against a clay support surface 5 with the foamed plastics material 3 and polycarbonate 2 at the rear, nearer the clay, and the "KEVLAR" 1 at the front facing away from the clay. Shots were then fired at the sample perpendicular to its front face, and the depth D of the impression made in the clay by the impact of the shot was measured, this being taken as a measure of the trauma. FIG. 1 shows the impact of a typical shot 6. The following Table 1 shows the depth of the depression D produced in the clay with different samples having the number of sheets of polycarbonate and thickness specified in the Table. The shot fired at the sample in all cases was 9 mm calibre ammunition, and the velocity of each shot was measured and used to calculate a normalised value of the depression which can then be compared with the normalised values from tests.

TABLE 1

| Test No. | No. of Sheets | Thickness mm | Velocity m/s | Trauma mm |
|---|---|---|---|---|
| 1 | 0 | 0 | 342 | 26 |
| 2 | 0 | 0 | 356 | 31 |
| 3 | 1 | 0.175 | 351 | 24 |
| 4 | 1 | 0.175 | 358 | 24 |
| 5 | 1 | 0.250 | 344 | 23 |
| 6 | 1 | 0.250 | 351 | 21 |
| 7 | 1 | 0.250 | 354 | 19 |
| 8 | 1 | 0.250 | 356 | 22 |
| 9 | 2 | 0.175 | 327 | 21 |
| 10 | 2 | 0.175 | 357 | 19 |
| 11 | 2 | 0.175 | 337 | 18 |
| 12 | 2 | 0.175 | 348 | 18 |
| 13 | 2 | 0.175 | 345 | 17 |
| 14 | 2 | 0.175 | 353 | 13 |
| 15 | 2 | 0.250 | 353 | 20 |
| 16 | 2 | 0.250 | 349 | 18 |
| 17 | 2 | 0.250 | 325 | 18 |
| 18 | 1 | 1.0 | 336 | 16 |

The first two tests shown in the Table 1 used samples without any polycarbonate behind the "KEVLAR". The other tests used samples with one or two layers of polycarbonate with a nominal thickness of 0.175 or 0.250 mm. The final test used a sample incorporating a single sheet of polycarbonate of nominal thickness 1 mm.

Test results clearly demonstrate that even a single sheet of polycarbonate 0.175 or 0.250 mm thick has a significant effect in reducing the depth of depression in the clay, i.e the trauma, the average trauma being 21 mm compared with an average trauma of 28 mm for the sample with no polycarbonate.

The test results using two sheets of polycarbonate 0.175 or 0.250 mm thick show that the trauma is reduced still further, the average being 17 to 18 mm. Clearly, this compares favorably with the trauma of 16 mm for the sample having a single sheet of polycarbonate 1 mm thick.

Furthermore, comparing the performance of the samples having two sheets of polycarbonate, one with sheets using 0.175 mm thick and the other with sheets 0.250 mm thick, it is clear that the overall increase in thickness of 40% between the two samples does not produce a proportional difference in the level of trauma protection that they afford.

Another series of comparative tests were carried out on samples of body armor made up in a similar manner to that described above except that only 18 layers of "KEVLAR" were used, and the number of sheets of polycarbonate were varied so that a first sample had just one sheet of nominal thickness 0.750 mm, a second sample had two sheets each of nominal thickness 0.375 mm a third sample had three sheets each of nominal thickness 0.250 mm, and a fourth sample had four sheets each of nominal thickness 0.175 mm. The overall thickness of polycarbonate used in each trauma pack was therefore the same or substantially the same. In these tests, the same sample had five shots fired at it in different positions across the front face of the sample, the first four shots being at right angles to the sample and the fifth shot being at an angle of 40° to the perpendicular. The results are shown in the following Table 2.

TABLE 2

| Test No. | No. of Sheets | Thickness mm | Velocity m/s | Trauma mm |
|---|---|---|---|---|
| 1 | 1 | 0.750 | 354 | 22 |
| 2 | 1 | 0.750 | 339 | 23 |
| 3 | 1 | 0.750 | 352 | 21 |
| 4 | 1 | 0.750 | 339 | 22 |
| 5 | 1 | 0.750 | 350 | 20 |
| 6 | 2 | 0.375 | 349 | 23 |
| 7 | 2 | 0.375 | 335 | 22 |
| 8 | 2 | 0.375 | 352 | 22 |
| 9 | 2 | 0.375 | 343 | 21 |
| 10 | 2 | 0.375 | 345 | 16 |
| 11 | 3 | 0.250 | 346 | 22 |
| 12 | 3 | 0.250 | 350 | 27 |
| 13 | 3 | 0.250 | 352 | 21 |
| 14 | 3 | 0.250 | 340 | 22 |
| 15 | 3 | 0.250 | 337 | 18 |
| 16 | 4 | 0.175 | 349 | 26 |
| 17 | 4 | 0.175 | 326 | 24 |
| 18 | 4 | 0.175 | 338 | 21 |
| 19 | 4 | 0.175 | 335 | 23 |
| 20 | 4 | 0.175 | 359 | 18 |

The results shown in Table 2 clearly demonstrate that a similar level of trauma protection is given in all cases. That is, replacing a single sheet of polycarbonate 0.750 mm thick with multiple laminations of thinner sheets so as to produce the same overall thickness, does not produce any substantial deterioration in the level of trauma protection given.

Figure 3:
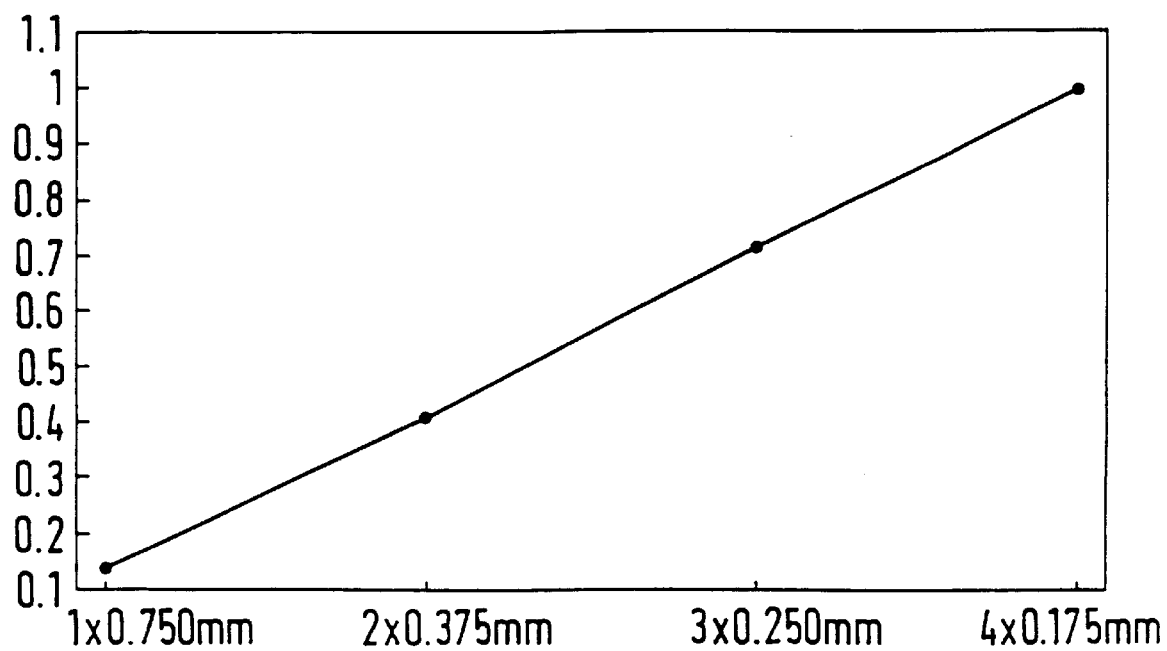
FIG. 3 shows a curve of flexibility against lamination thickness of a layer of polycarbonate.

The increase in flexibility caused by using thinner sheets of polycarbonate was demonstrated in another set of tests by supporting a sample of a predetermined length and width at one end so that it extends horizontally, and measuring the vertical deflection of the free end. Four samples were tested, one being a sample of a single sheet 0.750 mm thick, the second being a sample of two sheets 0.375 mm thick, the third being a sample of three sheets 0.250 mm thick, and the fourth being a sample of four sheets 0.175 mm thick. The results obtained are shown in the graph of FIG. 3. This clearly demonstrates that the flexibility of a polycarbonate layer increases at a constant rate if it is laminated using increasingly thinner sheets of polycarbonate for maximum flexibility and optimum trauma protection it is perfect to use polycarbonate sheet equal to or less than 0.250 mm or 0.175 mm.

It will be appreciated that whilst polycarbonate is used as the impact-absorbing plastics material in the examples quoted above, other suitable plastics material which is molded by an impact and thereby absorbs impact energy can be used. Similarly, the "KEVLAR" used for the ballistic-resistant material can be replaced by any known alternative material.

Figure 2:
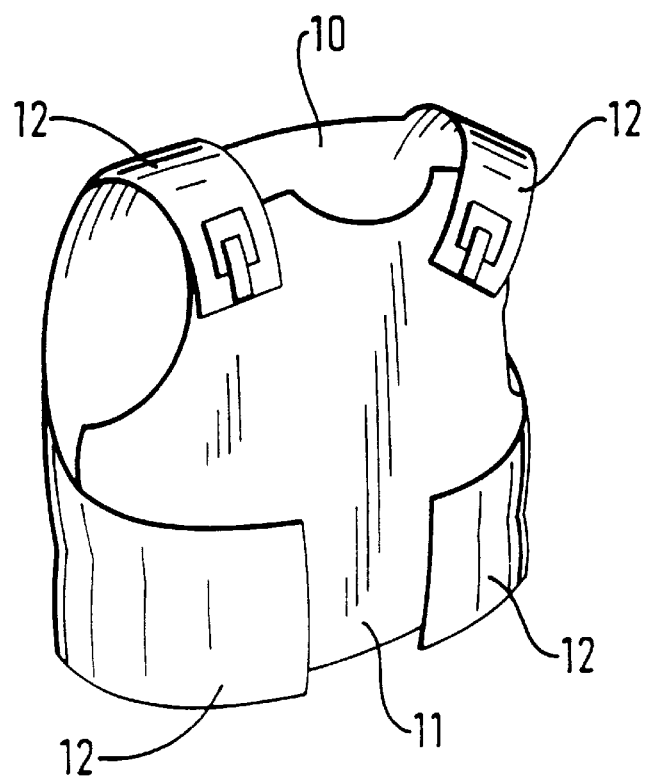
FIG. 2 shows a garment made up from body armor as shown in FIG. 1.

FIG. 2 shows a protective garment which incorporates body armor as shown in FIG. 1, throughout, the body armor being flexible enough to bend around the sides of the torso and over the shoulders of a wearer. The garment basically takes the form of front and rear sections 10 and 11, respectively, with the rear section 10 having flap portions 12 which pass over the shoulders and around the sides of a wearer and fasten to the front section 11 with hook-and-felt fasteners 13 such as sold under the trade mark "VELCRO". Additional items of body armor may be attached permanently or releasably to the basic garment such as a collar protector, a throat protector, an upper arm protector, a high underarm protector, a groin protector, a pelvic protector, a rear seat protector or a leg protector.

Figure 4:
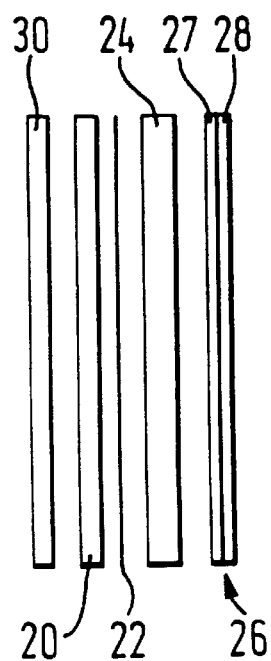
FIG. 4 is a cross-section through another sample of body armor in accordance with the invention.

FIG. 4 shows a section through body armor with the constituent layers in exploded form for clarity. In the construction of FIG. 4, layer 20 comprises 20 plies of "SPECTRASHIELD", layer 22 comprises a single sheet of polycarbonate film 0.25 mm thick, layer 24 comprises 40 plies of "SPECTRASHIELD", layer 26 comprises multiple sheets of polycarbonate film 27, and layer 28 comprises closed cell foam.

In an alternative embodiment, the body armor construction of FIG. 4 can be modified by using "KEVLAR" cloth instead of "SPECTRASHIELD" in layer 24.

The position of the sheet of polycarbonate film 22 between the ballistic-resistant layers 20 and 24 makes these layers less susceptible to the problem of forced creasing.

Body armor such as shown in FIGS. 1 or 4 may be supplemented by a further protective layer in front of the layers 1, 20, this further layer, shown as 30 in FIG. 4, taking the form of hard armor composed of ceramic or metal plate to absorb the initial impact of a high velocity projectile, or stab-resistant armor composed of multiple flexibly interconnected ceramic or metal plates.

What is claimed is:

1. A protective shield comprising a flexible penetration-resistant layer with a front face and a rear face for use with the front face directed towards a region of ballistic threat to protect a region adjacent to the rear face, and a flexible impact-absorbing layer located adjacent to the rear face of the penetration-resistant layer, wherein the impact-absorbing layer consists of a plurality of layers of impact-absorbing impact moldable plastics material each having a thickness of no more than 0.5 mm.

2. A shield as claimed in claim 1 in which each layer of impact-absorbing plastics material is no more than 0.25 mm thick.

3. The shield as claimed in claim 2 wherein said layers of impact-absorbing impact moldable plastics material includes at least three layers of said plastics material.

4. A shield as claimed in claim 1 in which each layer of impact-absorbing plastics material is no more than 0.175 mm thick.

5. A shield as claimed in claim 1 in which the impact-absorbing layer has an overall thickness of less than 0.75 mm.

6. A shield as claimed in claim 1 in which the impact-absorbing layer has an overall thickness no less than 0.25 mm.

7. A shield as claimed in claim 1 in which the impact-absorbing layer has an overall thickness no less than 0.5 mm.

8. A shield as claimed in claim 1 in which the impact-absorbing plastics material comprises polycarbonate.

9. A shield as claimed in claim 1 in which the penetration-resistant layer comprises at least one material selected from the group consisting of aramid fiber and polyethylene fiber.

10. A shield as claimed in claim 9 in which the penetration-resistant layer comprises at least one rigid plate.

11. A shield as claimed in claim 1 in which a layer of resiliently compressible material is provided adjacent to the impact-absorbing layer on that side opposite the penetration-resistant layer.

12. A shield as claimed in claim 1 in which the penetration-resistant layer comprises at least two layers of flexible penetration-resistant material and located therebetween, a number of layers of flexible impact absorbing material each less than 0.75 mm thick.

13. A shield as claimed in claim 12 in which the penetration-resistant material comprises polyethylene.

14. A shield as claimed in claim 1 wherein said shield is in the form of a garment to be worn by a person to be protected.

15. The shield as claimed in claim 1 wherein said layers of impact-absorbing impact moldable plastics material includes at least two layers of said plastics material.

* * * * *